US012113607B2

(12) United States Patent
Xenakis et al.

(10) Patent No.: US 12,113,607 B2
(45) Date of Patent: Oct. 8, 2024

(54) SATELLITE COMMUNICATIONS WITH MULTIPLE CLASSES OF TERRESTRIAL TERMINAL DEVICES

(71) Applicant: IRIDIUM SATELLITE LLC, McLean, VA (US)

(72) Inventors: George Xenakis, Tempe, AZ (US); Hermon Pon, McKinney, TX (US); Charles Woloszynski, Vienna, VA (US)

(73) Assignee: IRIDIUM SATELLITE LLC, McLean, VA (US)

( * ) Notice: Subject to any disclaimer, the term of this patent is extended or adjusted under 35 U.S.C. 154(b) by 0 days.

(21) Appl. No.: 17/857,568

(22) Filed: Jul. 5, 2022

(65) Prior Publication Data

US 2023/0061148 A1 Mar. 2, 2023

Related U.S. Application Data

(63) Continuation of application No. 15/690,646, filed on Aug. 30, 2017, now Pat. No. 11,381,304.

(51) Int. Cl.
*H04B 7/185* (2006.01)
(52) U.S. Cl.
CPC ..... *H04B 7/18543* (2013.01); *H04B 7/18528* (2013.01); *H04B 7/1855* (2013.01); *H04B 7/18589* (2013.01); *H04B 7/18506* (2013.01)
(58) Field of Classification Search
None
See application file for complete search history.

(56) References Cited

U.S. PATENT DOCUMENTS

| 6,823,185 B1* | 11/2004 | Comer | H04B 7/185 455/433 |
| 2006/0023717 A1* | 2/2006 | Trachtman | H04L 1/0083 370/392 |
| 2014/0120830 A1* | 5/2014 | Rozmaryn | H04B 17/40 455/9 |
| 2015/0119058 A1* | 4/2015 | Rune | H04W 52/0219 455/452.1 |
| 2017/0078826 A1* | 3/2017 | Cui | H04W 8/24 |

(Continued)

*Primary Examiner* — Ernest G Tacsik
(74) *Attorney, Agent, or Firm* — Baker Botts L.L.P.

(57) ABSTRACT

In one implementation, a communications satellite includes a main antenna system and a communications controller. The main antenna system is configured to send communications to and receive communications from one or more terrestrial terminal devices. The communications controller has a memory storing a plurality of terminal attribute sets, each of which specifies attributes for communicating with a corresponding class of terrestrial terminal devices. The communications controller is configured to receive a terminal class identifier from an active terrestrial terminal device, identify, from among the stored terminal attribute sets, a particular terminal attribute set as corresponding to the terminal class identifier received from the active terrestrial terminal device, and control the communications satellite to communicate with the active terrestrial terminal device according to the attributes for communicating specified in the particular terminal attribute set identified as corresponding to the terminal class identifier received from the active terrestrial terminal device.

18 Claims, 4 Drawing Sheets

(56) References Cited

U.S. PATENT DOCUMENTS

| | | | |
|---|---|---|---|
| 2017/0086183 A1* | 3/2017 | Yi | H04W 72/20 |
| 2021/0076389 A1* | 3/2021 | Zhang | H04L 27/2694 |
| 2023/0038582 A1* | 2/2023 | Lin | H04B 7/18519 |
| 2023/0041601 A1* | 2/2023 | Vangala | H04W 36/32 |
| 2023/0050088 A1* | 2/2023 | Wu | H04L 5/0042 |
| 2023/0268974 A1* | 8/2023 | Liu | H04L 5/0023 370/329 |

* cited by examiner

| CLASSMARK | TERMINAL / ANTENNA ATTRIBUTES | | | SUPPORTED CARRIERS | | RUs PER TS / FRAME | | C8 RU TYPE | UPLINK RU ADJACENCY |
|---|---|---|---|---|---|---|---|---|---|
| VALUE | CLASS | G/T | EIRP | UP | DOWN | UP | DOWN | | |
| 0 | Broadband Terminal | -18 | 15.2 | C1 QPSK 4/5, C2 QPSL 2/3, C8 QPSK 2/3, C8 16APSK 2/3, | C1 QPSK 4/5, C2 QPSL 2/3, C8 QPSK 2/3, C8 16APSK 2/3, | 1/4 | 2/8 | BBWCRU | N/A |
| 1 | Narrowband Terminal | -27 | 9 | C1 QPSK 4/5, C2 QPSL 2/3, C8 QPSK 2/3, | C1 QPSK 4/5, C2 QPSL 2/3, C8 QPSK 2/3, | 1/4 | 1/4 | BBWCRU | N/A |
| 2 | Handheld Terminal | -29 | 5 | C1 QPSK 4/5, C2 QPSL 2/3, | C1 QPSK 4/5, C2 QPSL 2/3, C8 QPSK 2/3, | 1/1 | 1/4 | WCRU | N/A |
| 3 | Broadband Terminal | -18 | 15.2 | C1 QPSK 4/5, C2 QPSL 2/3, C8 QPSK 2/3, C8 16APSK 2/3, | C1 QPSK 4/5, C2 QPSL 2/3, C8 QPSK 2/3, C8 16APSK 2/3, | 2/8 | 2/8 | BBWCRU | YES |
| 4 | Narrowband Terminal | -17 | 9 | C1 QPSK 4/5, C2 QPSL 2/3, C8 QPSK 2/3, | C1 QPSK 4/5, C2 QPSL 2/3, C8 QPSK 2/3, | 1/4 | 2/8 | BBWCRU | N/A |

| 5 | Narrowband Terminal | -27 | 9 | C1 QPSK 4/5, C2 QPSL 2/3, C8 QPSK 2/3, | C1 QPSK 4/5, C2 QPSL 2/3, C8 QPSK 2/3, | 2/8 | 2/8 | BBWCRU | YES | continued from FIG. 4A

FIG. 4B

SATELLITE COMMUNICATIONS WITH MULTIPLE CLASSES OF TERRESTRIAL TERMINAL DEVICES

CROSS-REFERENCE TO RELATED APPLICATION

The present application is a continuation of U.S. patent application Ser. No. 15/690,646 filed on Aug. 30, 2017, the disclosure of which is incorporated herein by reference in its entirety.

TECHNICAL FIELD

This disclosure relates generally to accommodating multiple terminal classes, and specifically to accommodating multiple terminal classes in a satellite system.

SUMMARY

According to one implementation of the disclosure, a communications satellite includes a main antenna system and a communications controller. The main antenna system is configured to send communications to and receive communications from one or more terrestrial terminal devices. The communications controller has a memory storing a plurality of terminal attribute sets, each of which specifies attributes for communicating with a corresponding class of terrestrial terminal devices. The communications controller is configured to receive a terminal class identifier from an active terrestrial terminal device, identify, from among the stored terminal attribute sets, a particular terminal attribute set as corresponding to the terminal class identifier received from the active terrestrial terminal device, and control the communications satellite to communicate with the active terrestrial terminal device according to the attributes for communicating specified in the particular terminal attribute set identified as corresponding to the terminal class identifier received from the active terrestrial terminal device.

According to another implementation of the disclosure, a plurality of terminal attribute sets, each of which specifies attributes for communicating with a corresponding class of terrestrial terminal devices, are stored in a memory associated with a communications controller of a communications satellite. A terminal class identifier is received from an active terrestrial terminal device via a main antenna system of the communications satellite that is configured to send communications to and receive communications from one or more terrestrial terminal devices in a satellite communications network. Thereafter, a particular terminal attribute set is identified from among the stored terminal attribute sets as corresponding to the terminal class identifier received from the active terrestrial terminal device, and the communications satellite is controlled to communicate with the active terrestrial terminal device according to the attributes for communicating specified in the particular terminal attribute set identified as corresponding to the terminal class identifier received from the active terrestrial terminal device.

Other features of the present disclosure will be apparent in view of the following detailed description of the disclosure and the accompanying drawings. Implementations described herein, including the above-described implementations, may include a method or process, a system, or computer-readable program code embodied on computer-readable media.

BRIEF DESCRIPTION OF THE DRAWINGS

For a more complete understanding of the present disclosure, reference now is made to the following description taken in connection with the accompanying drawings.

FIGS. 4A-4B illustrate an example terminal class table according to a non-limiting implementation of the present disclosure.

DETAILED DESCRIPTION

Figure 1:
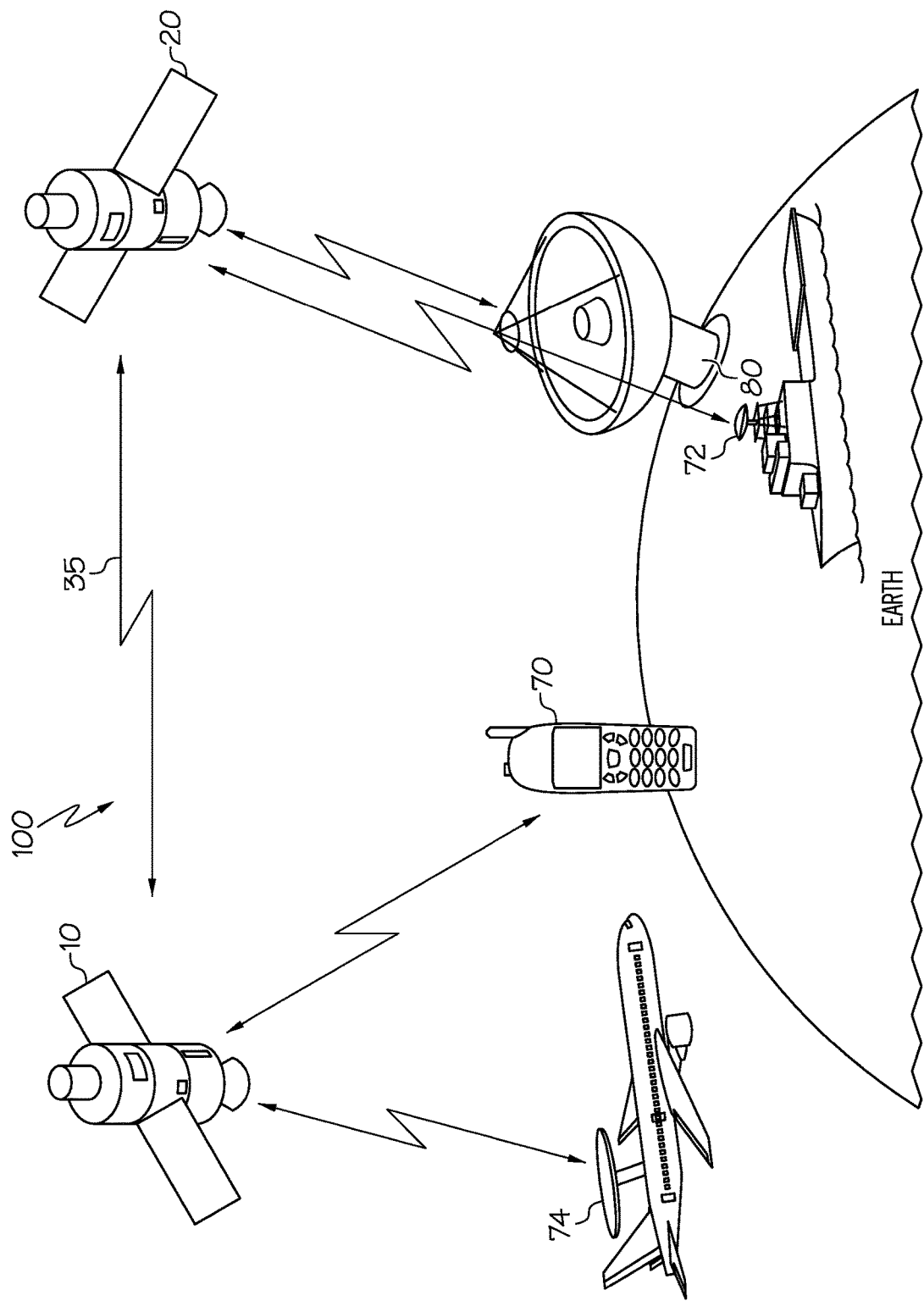
FIG. 1 is a high-level block diagram of a system for accommodating multiple terminal classes in a satellite system in accordance with a non-limiting implementation of the present disclosure.

A satellite communications system enables wireless voice and data communications. Hand-held satellite phones and other terminals transmit communications to and/or receive communications from one or more satellites in the satellite communications network. The satellites route communications received from or destined to terminals through the satellite communications network, for example, through inter-satellite wireless communications crosslinks, and/or to one or more interfaces to external communications networks (including, but not limited to, the Internet and/or telephone communications networks), for example, via a terrestrial Earth station, ground gateway, or other communications network servicing station.

By coordinating the regions to which multiple satellites provide service coverage, a satellite communications network may provide service coverage across an expansive geographic region and, in some cases, globally. In some implementations, a satellite communications network may be composed of multiple satellites in low-Earth orbit ("LEO") (e.g., having an altitude between the Earth's surface and approximately 1,200 miles) arranged in coordinated orbits to provide service coverage across large regions of the Earth. In one particular implementation, a satellite communications network may be composed of multiple LEO satellites (e.g., 66 satellites) that are connected by wireless inter-satellite communications crosslinks and that are arranged in multiple planes (e.g., 6 planes of 11 satellites each) having substantially polar orbits so as to provide substantially global service coverage. In such an implementation, as the satellites orbit, the geographic regions covered by their coverage footprints may change such that, in order to continue to handle a communications session with a particular terminal, the communications session may be handed off from one satellite to another. Additionally or alternatively, in some implementations, a communications session with a particular terminal also may be handed off between different beams of an individual satellite as the satellite orbits and the geographic regions covered by the beams of the satellite change.

As described above, in some implementations, a satellite communications network may interface with one or more additional external networks. In such implementations, a ground gateway may provide the interface between the satellite communications network and one or more additional external networks. When communications that originate within the satellite communications network and that are destined for an external network reach such a ground gateway, the ground gateway (and, in some implementations, one or more additional components such as, for example, a switch) routes the communications to appropriate destinations on the external network. Additionally or alternatively, the ground gateway may perform data transformations and other processing functions to convert communications from the satellite network into a format recognized by the destination external network. Similarly, communications that originate on an external network and that are destined for the satellite communications network may be received by the ground gateway and routed to appropriate destinations on the satellite communications network. In such cases, the ground gateway may perform data transformations and other processing functions to convert the communications from the external network into a format recognized by the satellite communications network before routing the communications to terminals in the satellite communications network.

In some implementations, a satellite communications network may be configured to provide numerous different communications services across the network. For example, the satellite communications network may be configured to provide a voice and/or telephony service as well as one or more different data services, including, but not limited to, a short data message service, broadband Internet service, and streaming audio and/or video services.

Additionally or alternatively, the satellite communications network may be configured to service numerous different types of terrestrial terminals. Such terminals may be designed to access one or more of the different services available over the satellite communications network. Furthermore, such terminals may have different characteristics and/or specifications based on the services that they are intended to access, the use cases and/or installations that they are designed for, and a variety of other factors (e.g., size, power, etc.). For example, a satellite telephone terminal may have different characteristics than a terminal designed to provide high speed data services to aircraft, and a satellite telephone terminal and a terminal designed to provide high speed data services to aircraft both may have different characteristics than a terminal designed to provide high speed data services to a commercial ship like a container ship or a fishing vessel. Specific examples of such different characteristics may include, but are not limited to, different transmit equivalent (or effective) isotropically radiated power ("EIRP") levels; different receive antenna gain-to-noise temperature ("G/T") ratios; different supported uplink and/or downlink carriers, including, for example, different radio frequency ("RF") channel widths, different carrier signal modulation schemes, and different forward error correction rates; different permitted signal bursts (or reuse units ("RUs")) per time slot and/or frame; and different permitted frequency assignments.

In some implementations, in order for a satellite to be able to successfully communicate with each of the various different terminals configured to communicate over the satellite communications network, it may be important for the satellite to know the different types of services each terminal is designed to access and/or the different characteristics or specifications of each terminal. In such implementations, a satellite may be able to control the manner in which it communicates with different types of terminals to facilitate successful communications with each of the different types of terminals configured to communicate over the satellite communications network. For example, in some implementations, when a satellite establishes communications with a terminal having a relatively low EIRP, the satellite may determine to perform additional amplification of signals received from the terminal than when the satellite establishes communications with a terminal having a higher EIRP. Furthermore, in some implementations, the satellite may take a terminal's EIRP into account in performing spectrum allocation planning and/or self-interference mitigation at the satellite level. Additionally or alternatively, when a satellite establishes communications with a terminal having a relatively low G/T ratio, the satellite may determine to transmit a higher power signal for the terminal than when the satellite establishes communications with a terminal having a higher G/T ratio. Moreover, in some implementations, the satellite may take a terminal's G/T ratio into account in managing power transmission levels at the satellite level. In such implementations, a satellite may have a maximum transmit power limit and the satellite may take the G/T ratios of all terminals currently communicating and/or attempting to communicate with the satellite into account in determining transmit power levels for each of the terminals. Similarly, in some implementations, a satellite may determine appropriate uplink and/or downlink carriers for communicating with a particular terminal based on the different uplink and/or downlink carriers supported by terminals belonging to the terminal's terminal class. Likewise, in some implementations, a satellite may determine how often to establish uplink and/or downlink communications with a particular terminal based on the permitted signal bursts/RUs per time slot and/or frame for terminals belonging to the terminal's terminal class. Additionally or alternatively, in some implementations, a satellite may determine frequencies to assign for uplink and/or downlink communications with a particular terminal based on the different permitted frequency assignments for terminals belonging to the terminal's terminal class.

The teachings of the present disclosure present techniques for accommodating different types of terminals in a satellite communications network, including new terminal types introduced after the satellite communications network has been launched and deployed. As described in greater detail below, in some implementations, individual satellites within a satellite communications network may store a table, or other data structure, of defined terminal classes that specifies different sets of attributes for each of a variety of different classes of terminals. Examples of such attributes that may be specified for each class of terminal in such a table or other data structure may include, but are not limited to, transmit EIRP levels, receive G/T ratios, supported carriers, permitted signal bursts/RUs per time slot and/or frame, and permitted frequency assignments.

During a call setup process, when a terminal attempts to establish a communications session over the satellite communications network, the terminal may transmit a terminal class identifier identifying the terminal class to which the terminal belongs to the satellite servicing the terminal. The satellite then may use the terminal class identifier received from the terminal to identify different attributes of the corresponding terminal class that are relevant to communicating with the terminal. Thereafter, the satellite may configure its communications with the terminal according to the attributes specified for the terminal class identified as corresponding to the terminal.

Certain characteristics of the satellites of a satellite communications network may not be capable of being changed (or may be difficult to change) after the satellites have been launched and deployed. For example, in some implementations, the received signal strength floor, the maximum signal transmit power, the different supported services, the different supported carriers, the different permitted signal bursts/RUs per time slot and/or frame, and the different transmit and/or receive frequencies that the satellites are configured to be able to accommodate may not be modifiable (or may be difficult to modify) after the satellites have been launched and deployed. Nevertheless, given the variety of different received signal strengths, transmit power levels, supported services, supported carriers, permitted signal bursts/RUs per time slot and/or frame, and transmit and receive frequencies that the satellites may be designed to support, there may be a vast number of different combinations of these characteristics and, thus, a vast number of different classes of terminals that the satellites may be capable of supporting, some, or many of which, may not have been introduced prior to the launch and deployment of the satellites.

Uploading and/or configuring specific software modules to enable the satellites to communicate with each of these different possible classes of terminals may be exceedingly difficult, cumbersome, resource intensive, or costly, especially for new classes of terminals introduced after the satellites have been launched and deployed. Therefore, prior to their launch and deployment, the satellites may be configured to be capable of communicating with each of the different possible classes of terminals given the different possible combinations of characteristics that the satellites are capable of supporting. As specific classes of terminals are introduced for operation on the satellite communications network, entries identifying the particular sets of attributes relevant for communicating with each class of terminal may be added to the table, or other data structure, of defined terminal classes. Then, when a specific terminal attempts to establish a communications session over the satellite communications network, the terminal may transmit a terminal class identifier identifying the terminal class to which the terminal belongs to the satellite serving the terminal such that the satellite can ascertain the terminal class of the terminal and adapt its communications with the terminal accordingly. In this manner, the satellites of a satellite communications network may be able to accommodate and successfully communicate with a wide range of different terminal classes, including both terminals that existed prior to the launch and deployment of the satellites as well as newly introduced terminals that had not been introduced when the satellites were launched and deployed.

With reference to FIG. 1, a system for accommodating multiple different terminal classes in a satellite communications system is illustrated in accordance with a non-limiting implementation of the present disclosure. System 100 includes satellites 10 and 20 in a satellite communications network that also includes earth terminal 80 and terrestrial terminals 70, 72, and 74. As illustrated in FIG. 1, satellites 10 and 20 are equipped with crosslink antennas that enable satellites 10 and 20 to establish wireless inter-satellite communications crosslinks 35. As also illustrated in FIG. 1, terminal 70 is a satellite telephone terminal, terminal 72 is installed on a ship and designed for maritime applications, and terminal 74 is installed on an aircraft and designed for aviation applications. As such, each of terminals 70, 72, and 74 may be designed to access one or more different services available over the satellite communications network and may have different characteristics and/or specifications, such as, for example, different transmit EIRP levels, different G/T ratios, different supported carriers, different permitted signal bursts/RUs per time slot and/or frame, and different permitted frequency assignments. Although not illustrated in FIG. 1, it will be appreciated that thousands, hundreds of thousands, or even millions of terrestrial terminals, including many different types of terminals, may communicate over the satellite communications network.

Satellites 10 and 20 each have onboard communications controllers that include or have access to onboard memory that stores terminal class tables or other data structures. Such terminal class tables or other data structures specify different sets of attributes for each of a variety of different classes of terminals that are intended to communicate over the satellite communications network. When a particular terminal attempts to establish a communications session over the satellite communications network with one of satellites 10 or 20, as part of the call setup process, the terminal transmits a terminal class identifier to the serving satellite, which uses the received terminal class identifier to perform a lookup function in the terminal class table or other data structure to identify the terminal class type for the particular terminal and relevant attributes for communicating with the particular terminal. Thereafter, the serving satellite may configure its communications with the particular terminal according to its terminal class type. For example, the satellite may tailor one or more of transmit power, receive amplification and/or processing, carrier signals, signal bursts/RUs per time slot and/or frame, frequency assignments, and/or other characteristics for communicating with the particular terminal.

For example, when terminals 70, 72, and 74 attempt to establish communications over the satellite communications network, terminals 70, 72, and 74 may transmit terminal class identifiers to the serving satellites 10 and 20 through which they are attempting to establish communications sessions, and the serving satellites 10 and 20 may configure their communications with terminals 70, 72, and 74 differently according to the specific attributes of each terminal class identified for terminals 70, 72, and 74.

As new classes of terminals are introduced for use on the satellite communications network, the terminal class tables stored in memory on board satellites 10 and 20 may be updated, for example via communications sent to satellites 10 and 20 via earth terminal 80, to add records for the new terminal classes that specify different sets of attributes for each of the newly introduced terminal classes.

Figure 2:
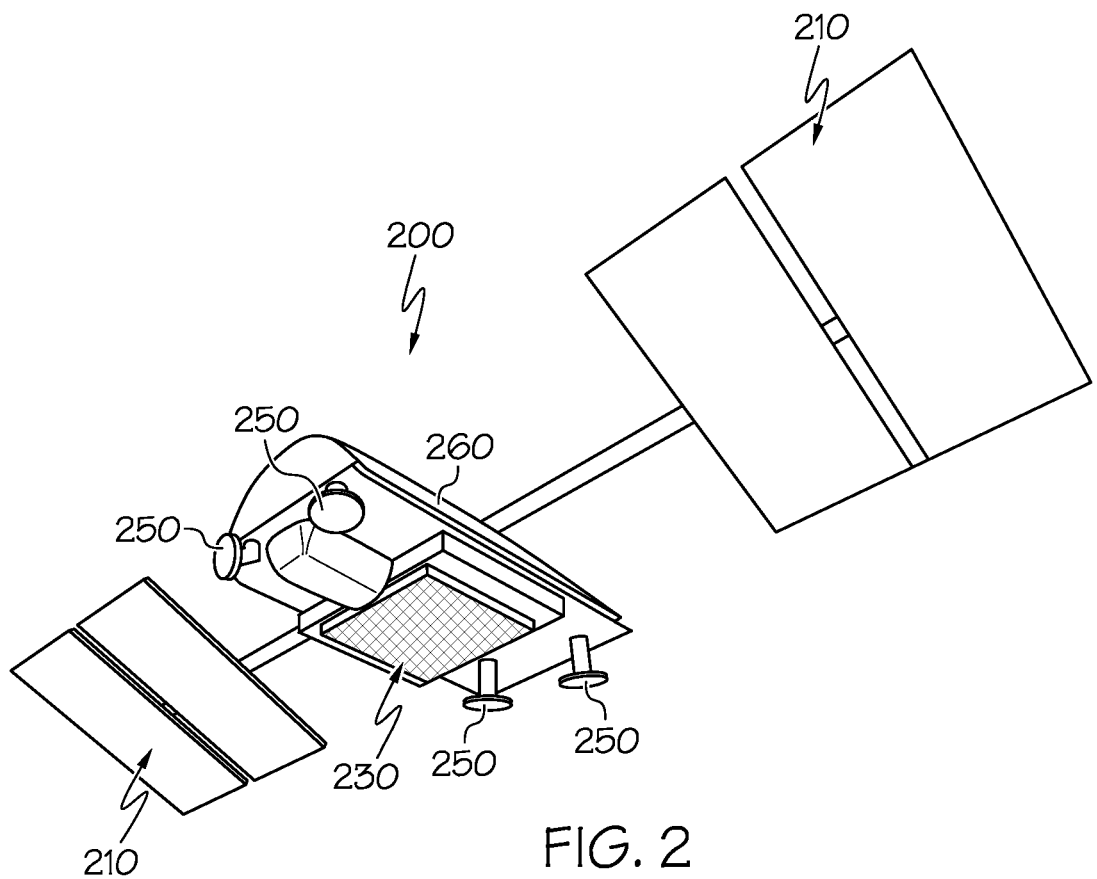
FIG. 2 is a block diagram of a satellite in accordance with a non-limiting implementation of the present disclosure.

With reference to FIG. 2, a block diagram of a satellite 200 for use in a satellite communications network configured to accommodate multiple terminal classes is illustrated in accordance with a particular non-limiting implementation of the present disclosure. As illustrated in FIG. 2, satellite 200 includes solar arrays 210 and a primary payload 260 housing a communications controller (not shown) configured to control main antenna system 230 and crosslink antennas 250. Communications controller further includes one or more processors or other processing elements (not shown) and a memory (not shown) that stores a terminal class table, or other data structure, in accordance with the terminal class tables or other data structures described in the present disclosure.

Figure 3:
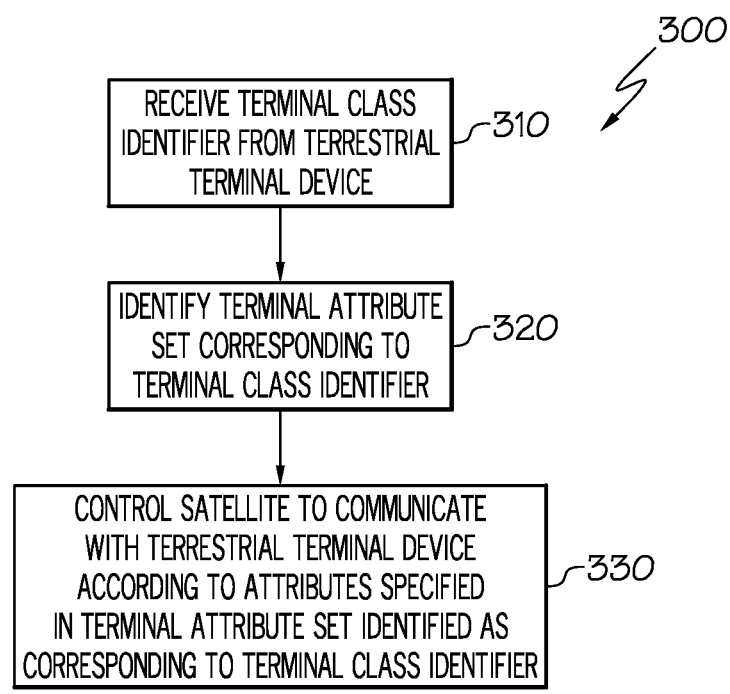
FIG. 3 is a flow chart of a method for accommodating multiple terminal classes in a satellite system in accordance with a non-limiting implementation of the present disclosure.

With reference to FIG. 3, a flow chart 300 of a method for accommodating multiple terminal classes in a satellite communications system is illustrated in accordance with a non-limiting implementation of the present disclosure. Such a method may be implemented, for example, within a communications controller of a satellite.

At step 310, a terminal class identifier is received from a terrestrial terminal device. For example, a terrestrial terminal device may initiate a communications session with a serving satellite within a satellite communications network. During the call setup process, the terminal device may negotiate communications settings with the serving satellite providing satellite network coverage to the terminal. During this process, the serving satellite receives the terminal class identifier from the terminal device.

At step 320, a terminal attribute set corresponding to the received terminal class identifier is identified. For example, the communications controller of the serving satellite may include or have access to memory that stores a terminal class table or other data structure that specifies different sets of attributes for each of a variety of different classes of terminals that are intended to communicate over the satellite communications network. In some particular implementations, such a terminal class table may include a separate row for each terminal class. The communications controller may perform a lookup on the terminal class table using the terminal class identifier to identify the corresponding set of attributes relevant to communicating with the particular terminal class to which the terminal belongs.

At step 330, the communications controller controls the satellite to communicate with the terminal device according to the attributes specified in the terminal attribute set identified as corresponding to the received terminal class identifier.

With reference to FIGS. 4A-4B, an example terminal class table is illustrated in accordance with a non-limiting embodiment of the present disclosure. As illustrated in FIGS. 4A-4B, the terminal class table includes six rows corresponding to six different classes of terminals (i.e., Terminal Classes 0-5). Although the example terminal class table illustrated in FIGS. 4A-4B shows six different terminal classes, it will be understood that implementations may include several hundred or more different terminal classes.

As also illustrated in FIGS. 4A-4B, the terminal class table specifies a higher-level class for each terminal reflected in the terminal class table. In particular, the example terminal class table illustrated in FIGS. 4A-4B identifies Terminal Classes 0 and 3 as belonging to the "Broadband Terminal" higher-level class, Terminal Classes 1, 4, and 5 as belonging to the "Narrowband Terminal" higher-level class, and Terminal Class 2 as belonging to the "Handheld Terminal" higher-level class.

The example terminal class table illustrated in FIGS. 4A-4B also specifies G/T ratios and EIRP levels for each terminal class along with supported uplink and downlink carriers for each terminal class. In particular, for each supported carrier, the example terminal class table identifies an RF channel width, a modulation scheme, and a forward error correction rate. As illustrated in FIGS. 4A-4B, the RF channel width for a particular supported carrier is identified as either being C1, C2, or C8, where C1 represents a single channel width, C2 represents a double channel width, and C8 represents an octuple channel width. In one particular implementation, a single channel width may represent a 41 kHz channel, a double channel width may represent an 82 kHz channel, and an octuple channel width may represent a 328 kHz channel. As also illustrated in FIGS. 4A-4B, the modulation scheme for a particular supported carrier is identified as being either QPSK (quadrature phase shift keying), QPSL, or 16 APSK (16-amplitude and phase-shift keying or 16-asymmetric phase-shift keying). Furthermore, the forward error correction rate for each particular supported carrier is illustrated in FIGS. 4A-4B as either ⅔ or ⅘, where the ⅔ forward error correction rate signifies that approximately ⅓ of the transmitted data is redundant (and for forward error correction purposes), and the ⅘ forward error correction rate signifies that approximately ⅕ of the transmitted data is redundant (and for forward error correction purposes).

The example terminal class table illustrated in FIGS. 4A-4B also specifies permitted signal bursts/RUs per time slot and frame for both the uplink and downlink for each particular terminal class. For example, for Terminal Class 0, the terminal class table identifies the maximum permitted signal bursts per time slot on the uplink as 1 and the maximum permitted signal bursts per frame on the uplink as 4. Similarly, the terminal class table identifies the maximum permitted signal bursts per time slot on the downlink as 2 and the maximum permitted signal bursts per frame on the downlink as 8. Likewise, for Terminal 1, the terminal class table identifies the maximum permitted signal bursts per time slot on the uplink as 1, the maximum permitted signal bursts per frame on the uplink as 4, the maximum permitted signal bursts per time slot on the downlink as 1, and the maximum permitted signal bursts per frame on the downlink as 4.

As illustrated in FIGS. 4A-4B, the example terminal class table also specifies certain permitted frequency assignments for each particular terminal class. More particularly, the example terminal class table specifies different schemes for allocating uplink or downlink frequencies when the different terminal classes are transmitting or receiving, respectively, via an octuple RF channel width (i.e., in the column labeled "C8 RU Type") and required uplink frequency assignments for terminal classes permitted to transmit multiple signal bursts/RUs per time slot (i.e., in the column labeled "Uplink RU Adjacency"). For example, the terminal class table specifies that terminals shall be assigned to either a broadband wild card reuse unit frequency scheme ("BBWCRU") or a wild car reuse unit frequency scheme ("WCRU"). Such assignments may enable satellites to assign frequencies to individual terminals in a manner that reduces the likelihood of problematic interference between terminals. With respect to terminals that are permitted to transmit multiple signal bursts/RUs per time slot, the example terminal class table illustrated in FIGS. 4A-4B specifies that the terminals either are or are not required to transmit concurrent signal bursts in adjacent frequencies if they transmit two signal bursts in the same time slot.

In certain implementations, use of terminal class identifiers with terminal class tables or other data structures as disclosed herein may reduce satellite system to terminal negotiation during the call setup process, which may reduce bandwidth or other resource utilization during the call setup and initiation phases and/or shorten the call setup and initiation phases. Additionally or alternatively, the use of a terminal class identifiers with terminal class tables or other data structures may help avoid a need for complicated and/or resource intensive software updates to satellites as new terminal types are introduced.

Aspects of the present disclosure may be implemented entirely in hardware, entirely in software (including firmware, resident software, micro-code, etc.) or in combinations of software and hardware that may all generally be referred to herein as a "circuit," "module," "component," or "system." Furthermore, aspects of the present disclosure may take the form of a computer program product embodied in one or more computer-readable media having computer-readable program code embodied thereon.

Any combination of one or more computer-readable media may be utilized. The computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of such a computer-readable storage medium include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, RF signals, etc., or any suitable combination of the foregoing.

Computer program code for carrying out operations for aspects of the present disclosure may be written in any combination of one or more programming languages, including object oriented programming languages, dynamic programming languages, and/or procedural programming languages.

The flowchart and block diagrams in the figures illustrate examples of the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order illustrated in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in any claims are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to explain the principles of the disclosure and the practical application, and to enable others of ordinary skill in the art to understand the disclosure with various modifications as are suited to the particular use contemplated.

What is claimed is:

1. A communications satellite comprising:
    a main antenna system configured to send communications to and receive communications from one or more terrestrial terminal devices in a satellite communications network;
    a communications controller having a memory storing a plurality of terminal attribute sets, each terminal attribute set specifying attributes for communicating with a corresponding class of terrestrial terminal devices, the communications controller configured to:
        receive, via the main antenna system, a terminal class identifier from an active terrestrial terminal device;
        identify, from among the stored terminal attribute sets, a particular terminal attribute set as corresponding to the terminal class identifier received from the active terrestrial terminal device, wherein the particular terminal attribute set includes an antenna gain-to-noise temperature attribute; and
        control the communications satellite to communicate with the active terrestrial terminal device according to the attributes for communicating specified in the particular terminal attribute set identified as corresponding to the terminal class identifier received from the active terrestrial terminal device, including the antenna gain-to-noise temperature attribute;
    a crosslink antenna system configured to facilitate communications between the communications satellite and one or more other communications satellites within the satellite communications network; and
    wherein the communications controller is further configured to process communications received from the active terrestrial terminal device as radio frequency signals, the radio frequency signals complying with one or more of the attributes for communicating specified in the particular terminal attribute set identified as corresponding to the terminal class identifier received from the active terrestrial terminal device.

2. The communications satellite of claim 1, wherein the communications controller is further configured to receive an update to the plurality of terminal attribute sets, the update comprising a new terminal attribute set for a new class of terrestrial terminal devices.

3. The communications satellite of claim 2, wherein the terminal class identifier received from the active terrestrial terminal device corresponds to the new terminal attribute set, and wherein the active terrestrial terminal device is designed to communicate according to the attributes for communicating specified in the new terminal attribute set.

4. The communications satellite of claim 3, wherein the new terminal attribute set corresponds to a new class of terrestrial terminal devices introduced to the satellite communications network after the launch of the communications satellite.

5. The communications satellite of claim 1, wherein each of the plurality of terminal attribute sets specifies attributes for communicating with a corresponding class of terrestrial terminal devices, comprising:
   antenna attributes for the corresponding class of terrestrial terminal devices; and
   carriers supported by the corresponding class of terrestrial terminal devices.

6. The communications satellite of claim 5, wherein the antenna attributes for the corresponding class of terrestrial terminal devices comprise:
   the antenna gain-to-noise-temperature attribute for the corresponding class of terrestrial terminal devices; and
   an equivalent isotropically radiated power attribute for the corresponding class of terrestrial terminal devices.

7. The communications satellite of claim 5, wherein the carriers supported by the corresponding class of terrestrial terminal devices comprise supported carrier modulation schemes for the corresponding class of terrestrial terminal devices.

8. The communications satellite of claim 1, wherein the communications controller is further configured to control the communications satellite to retransmit the communications received from the active terrestrial terminal device to a terrestrial earth terminal via one or more other communications satellites in the satellite communications network using the crosslink antenna system.

9. The communications satellite of claim 1, wherein the communications received from the active terminal device are voice communications.

10. The communications satellite of claim 1, wherein the communications received from the active terminal device are data communications.

11. A method of operating a communications satellite, the method comprising:
   storing, in a memory associated with a communications controller of the communications satellite, a plurality of terminal attribute sets, each terminal attribute set specifying attributes for communicating with a corresponding class of terrestrial terminal devices;
   receiving, via a main antenna system of the communications satellite configured to send communications to and receive communications from one or more terrestrial terminal devices in a satellite communications network, a terminal class identifier from an active terrestrial terminal device;
   identifying, from among the stored terminal attribute sets, a particular terminal attribute set as corresponding to the terminal class identifier received from the active terrestrial terminal device wherein the particular terminal attribute set includes an equivalent isotropically radiated power attribute; and
   controlling the communications satellite to communicate with the active terrestrial terminal device according to the attributes for communicating specified in the particular terminal attribute set identified as corresponding to the terminal class identifier received from the active terrestrial terminal device, including the equivalent isotropically radiated power attribute;
   processing communications received from the active terrestrial terminal device as radio frequency signals, the radio frequency signals complying with one or more of the attributes for communicating specified in the particular terminal attribute set identified as corresponding to the terminal class identifier received from the active terrestrial terminal device.

12. The method of claim 11, further comprising:
   receiving an update to the plurality of terminal attribute sets at the communications controller, the update comprising a new terminal attribute set for a new class of terrestrial terminal devices; and
   storing the new attribute set in the memory.

13. The method of claim 12, wherein the terminal class identifier received from the active terrestrial terminal device corresponds to the new terminal attribute set, and wherein the active terrestrial terminal device is designed to communicate according to the attributes for communicating specified in the new terminal attribute set.

14. The method of claim 11, wherein each of the plurality of terminal attribute sets specifies attributes for communicating with a corresponding class of terrestrial terminal devices, comprising:
   antenna attributes for the corresponding class of terrestrial terminal devices; and
   carriers supported by the corresponding class of terrestrial terminal devices.

15. The method of claim 14, wherein the carriers supported by the corresponding class of terrestrial terminal devices comprise supported carrier modulation schemes for the corresponding class of terrestrial terminal devices.

16. The method of claim 11, further comprising:
   receiving communications from the active terrestrial terminal device as radio frequency signals that comply with one or more of the attributes for communicating specified in the particular terminal attribute set identified as corresponding to the terminal class identifier received from the active terrestrial terminal device.

17. The method of claim 16, further comprising:
   retransmitting the communications received from the active terrestrial terminal device to a terrestrial earth terminal via one or more other communications satellites in the satellite communications network.

18. A communications satellite comprising:
   a main antenna system configured to send communications to and receive communications from one or more terrestrial terminal devices in a satellite communications network; and
   a communications controller having a memory storing a plurality of terminal attribute sets, each terminal attribute set specifying attributes for communicating with a corresponding class of terrestrial terminal devices including an antenna gain-to-noise temperature attribute, an equivalent isotropically radiated power attribute, and one or more supported digital modulation schemes for carrier signals for the corresponding class of terrestrial terminal devices, the communications controller configured to:
      receive, via the main antenna system, a terminal class identifier from an active terrestrial terminal device;
      identify, from among the stored terminal attribute sets, a particular terminal attribute set as corresponding to the terminal class identifier received from the active terrestrial terminal device; and
      control the communications satellite to communicate with the active terrestrial terminal device according to the antenna gain-to-noise temperature attribute, the equivalent isotropically radiated power attribute, and a particular one of the supported digital modulation schemes for carrier signals specified in the particular terminal attribute set identified as corresponding to the terminal class identifier received from the active terrestrial terminal device.

\* \* \* \* \*